United States Patent [19]
Corbellini et al.

[11] 3,905,913
[45] Sept. 16, 1975

[54] CATALYST SYSTEM FOR THE HOMO- AND CO-POLYMERIZATION OF OLEFINS, CONJUGATED OR UNCONJUGATED DIENES

[75] Inventors: Margherita Corbellini, Milan; Agostino Balducci, San Donato Milanese, both of Italy

[73] Assignee: Snam progetti S.p.A., San Donato Milanese, Italy

[22] Filed: Sept. 10, 1973

[21] Appl. No.: 395,592

[30] Foreign Application Priority Data
Mar. 11, 1970  Italy................. 21750/70

[52] U.S. Cl........ 252/429 A; 260/88.2 R; 260/93.7; 260/94.3; 260/94.9 B
[51] Int. Cl.².................... B01J 27/10; B01J 31/14
[58] Field of Search............ 252/429 A, 429 C

[56] References Cited
UNITED STATES PATENTS
3,245,976  4/1966  Marconi et al............ 252/429 A X
3,470,138  9/1969  Marconi et al............ 252/429 A X
3,534,006  10/1970  Kamaishi et al............ 252/429 A X

*Primary Examiner*—Patrick P. Garvin
*Attorney, Agent, or Firm*—Ralph M. Watson, Esq.

[57] ABSTRACT

A new catalyst system, for the homo- and copolymerization of olefins, conjugated or unconjugated dienes or mixtures thereof, is composed of a Ziegler catalyst transition metal compound and an aluminum compound having the general formula:

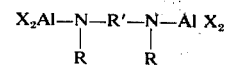

wherein X is hydrogen or halogen; both R's are hydrocarbon radicals; and R' is an unsaturated or saturated aliphatic divalent hydrocarbon radical, unsubstituted cycloalkyl radical or unsubstituted aryl radical.

6 Claims, No Drawings

CATALYST SYSTEM FOR THE HOMO- AND CO-POLYMERIZATION OF OLEFINS, CONJUGATED OR UNCONJUGATED DIENES

This is a division of application Ser. No. 123,052, filed Mar. 10, 1971 (now U.S. Pat. No. 3,781,318).

The present invention refers to new aluminum compounds, to the process for the preparation of the same and to the process utilizing said compounds as components of catalyst systems in the polymerization of unsaturated compounds. Aluminum compounds are known which have been employed in the recent past in the so-called low pressure polymerizations.

We have synthesized aluminum compounds as aforesaid which may be grouped in the two following classes:

1. monomer compounds consisting of substituted or unsubstituted aluminum hydrides having the formula H Al X Y and H Al X Y. Zn;
2. polymer compounds containing repeated units as

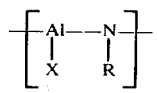

wherein X is H and/or halogen and R is a hydrocarbon radical.

The compounds according to the first formula and the employment of same are described in U.K. Patent Nos. 995,797; 980,773; and 979,391.

The compounds according to the second formula and the employment of same are described in U.K. Pat. Nos. 1,131,258; 1,131,257; 1,131,259; and 1,131,206.

The compounds according to the present invention are different both from those having the formula 1 and from those having the formula 2; they are quite new compounds and are very useful in the polymerization of compounds having at least one olefinic unsaturation.

The process for preparing the above compounds is essentially based on substitution reactions. The inventive compounds have the general formula:

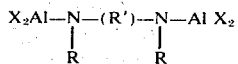

in which X is hydrogen, halogen or a secondary amine radical, both Rs are hydrocarbon radicals or form a ring and R' is a divalent hydrocarbon radical.

More particularly the invention refers to compounds having the formula:

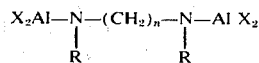

in which X and R have the aforesaid meanings and $n$ is a whole number ranging from 2 to 6.

According to current terminology, said compounds are called "diamidodialanes" and they will be referred to accordingly hereinafter.

The process for preparing the above compounds is essentially the following:

1. the chlorohydrate of the suitable diamine is prepared in ether (the composition of the obtained compound is analytically verified);
2. the amine hydrogen atoms are replaced by aluminum atoms one of which is bonded to a hydrogen atom; the other aluminum atoms may be bonded to hydrogen, to a halogen, to a secondary amine radical or to both latter compounds. The substitution is carried out by reacting the diamine chlorohydrate with hydride compounds of aluminum.

When the hydride aluminum compound is Li AlH$_4$, the reaction scheme is the following one:

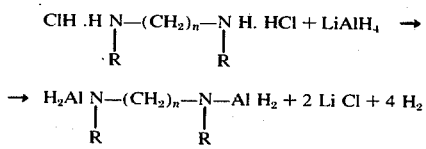

The reaction may also be carried out by starting with diamine and Al H$_3$. The synthesis of the inventive compounds may be easily carried out because it is based on the replacement of the amine hydrogen and involves a direct bond between amine nitrogen and a hydride aluminum atom. The synthesis is carried out at a temperature ranging from $-20°$ to 70°C and at a pressure which is given by the vapor pressure of the solvent at the working temperature.

The solvent may be selected from the class of ethers as, for example, dimethyl ether, diethyl ether, methyl ethyl ether, cyclic ethers and mixtures of hydrocarbon with the cited ethers.

The aluminum hydride compounds are selected from AlH$_3$, both etherate and polymer, Al H$_2$ Cl Et$_2$ O, H$_2$ Al N R$_2$. The other reactant is selected from the diamine compounds and the chlorohydrates of same. Examples of the latter compounds are 1,3-diethylamino-propane, NN'diethylethylenediamine, NN'dipropylethylenediamine, NN'diethylhexamethylenediamine and the chlorohydrates of the same.

The so obtained inventive compounds have the above said formula; NN'diethylenediamidodialane, N-N'dipropylethylenediamidodialane and the like may be cited among them. They are useful as components of catalyst systems in the polymerization of compounds having at least one olefinic unsaturation. The utilization range of the same is very large; in fact thay may advantageously replace the reducing compound of a Ziegler catalyst which notoriously consists of an aluminum metallorganic compound (reducing compound) and a transition metal compound. Therefore they are very suitable for providing catalysts having many uses and the advantages of uninflammability and the most safety.

Examples of monomers which may be polymerized are:

a. the olefins and their mixtures;
b. the conjugated and unconjugated diolefins and mixtures thereof;
c. the polyenes and mixtures thereof.

It is also possible to co-polymerize the compounds of class (a) both with the ones of the point (b) and with the ones of class (c).

The invention is now illustrated by the following unrestrictive examples:

EXAMPLES

1.

207 ml of a 2.97 M solution of Li Al H$_4$ were slowly added to 58.6 g of chlorohydrate of NN'diethylethylenediamine (MW = 189) corresponding to 620 mg atoms of nitrogen. The reaction suddenly occurred by freeing $H_2$; after the addition the solution was forced to boil at reflux for 2 hours. It was filtered, then the ethyl ether was eliminated by stripping and anhydrous benzene was added. All the operations were carried out in an inert and anhydrous room. The analyzed solution had the following composition:

Al = 1.32 mmoles/ml of solution
$H^*$ = 2.48 mmoles/ml of solution ($H^*$ = hydride hydrogen)
N = 1.47 mmoles/ml of solution

| Ratios | $\frac{H^*}{Al}$ | $\frac{N}{Al}$ |
|---|---|---|
| Theoretical value | 2 | 1 |
| Found value | 1.88 | 1.12 |

2.

An ether solution of Li Al $H_4$ (610 mmoles) was slowly added to 61.7 g of chlorohydrate of NN'diethylpropanediamine (MW = 203) corresponding to 610 mg atoms of nitrogen. The reaction suddenly occurred by freeing $H_2$; after the addition the solution was heated to boiling for about 4 hours, then was cooled and filtered. All operations were carried out under nitrogen and in an anhydrous vessel. Ethyl ether was removed by stripping and replaced by benzene. The analyzed solution had the following composition:

Al = 0.97 mmoles/ml
N = 1:10 mmoles/ml
$H^*$ = 1.8 mmoles/ml

Ratios theoretical value: $\frac{H^*}{Al} = 2$  $\frac{N}{Al} = 1$ found value: $\frac{H^*}{Al} = 1.86$  $\frac{N}{Al} = 1.14$ Solubility in cyclohexane and in n-heptane: 0.067 mmoles/cc.

3.

NN'diethylhexamethylenediamine was utilized in a working procedure according to Examples 1 and 2. A compound was obtained which was soluble in ethyl ether and benzene, very active and having the following composition:

Al = 0.157 mmoles/ml
N = 0.173 mmoles/ml
$H^*$ = 0.31 mmoles/ml from which the molar ratios resulted the following ones:

$\frac{H^*}{Al} = 1.97$ and $\frac{N}{Al} = 1.10$

4.

NN'diisopropylethylenediamine was utilized in a working procedure according to Examples 1 and 2. A compound was obtained which was soluble in ethyl ether and benzene, very active and having the following ratios:

$\frac{H^*}{Al} = 1.99$  $\frac{N}{Al} = 1.08$

These compounds were repeatedly synthesized and always gave constant analytical results. The said diamidodialanes were tested as catalysts with $TiCl_3$ and $TiCl_4$ in the coordinate anionic polymerization of unsaturated compounds.

5.

5.06 g of NN'diethylethylenediamine in 100 ml of n-heptane (corresponding to 95.4 mg atoms of nitrogen) were slowly added to 308 cc of an ether solution of $AlH_3 \cdot Et_2O$ (corresponding to 95.4 mmoles of Al). $H_2$ suddenly developed. After the addition, the mixture was stirred for 2 hours, then ether was distilled under vacuum and replaced by anhydrous benzene. The analyzed solution had the following composition:

Al = 0.704 mmoles/ml
N = 0.750 mmoles/ml
$H^*$ = 1.34 mmoles/ml

Ratios theoretical value: $\frac{H^*}{Al} = 2$  $\frac{N}{Al} = 1$ found value: $\frac{H^*}{Al} = 1.91$  $\frac{N}{Al} = 1.06$

POLYMERIZATION EXAMPLES: ETHYLENE

1.

Two liters of anhydrous and airless n-heptane was loaded into a 4 liter autoclave provided with a turbine stirrer; it was thermostated at 90°C, then the preformed catalyst was loaded, it consisting of 0.8 g of Ti $Cl_3AA$ (corresponding to 2 mmoles/lt) and of 0.34 g of NN'diethylethylenediamidodialane (corresponding to 4 mg atoms/liter of $H^*$) ($TiCl_3AA = TiCl_3$ activated by aluminum).

Hydrogen was fed at a pressure of 3 atmospheres, it acting as molecular weight regulator, then ethylene was sent up to a total pressure of 6 atmospheres and was kept at such a value by a flow regulated by the same running of the polymerization reaction. After two hours the reaction was stopped by n-butyl alcohol; after 3 hours of digestion it was centrifuged, washed water and acetone and then dried. 650 g of polyethylene were obtained having d = 0.959 and MFI = 0.198 (MFI = Melt flowing Index).

2.

The procedure of Example 1 was followed except for the catalyst which consisted of 0.8 g of $TiCl_3AA$ (corresponding to 2 mmoles/l) and of 0.35 g of NN'diethylpropanediamidodialane (corresponding to 4 mg atoms/liter of $H^*$). g 450 of polyethylene were obtained having d = 0.961 and MFI = 0.249.

3.

450 ml of n-heptane were loaded into a 1 liter autoclave provided with a propeller stirrer; it was thermostated at 90°, then the catalyst was loaded, it having been prepared starting from 0.74 g of $TiCl_3AA$ and 0.077 g of NN'diethylethylenediamidodialane in 150 ml of n-heptane, corresponding to a $H^*$/Ti ratio of 0.48.

It was pressurized by 4 atmospheres of $H_2$ and 1 atmosphere of ethylene and the pressure was kept at 5 atmospheres during the whole polymerization. After 2 hours of polymerization the pressure was removed, the catalyst was destroyed by butyl alcohol; then the polymer was filtered, washed with acetone and dried. 44 g of polyethylene were obtained, having d = 0.958 and MFI = 0.18.

4.

The procedure of Example 3 was followed and a catalyst was employed which consisted of 0.26 g of $TiCl_3AA$ and 0.16 g of NN'diethylethylenediamidodialane. 47 g of polyethylene were obtained having d = 0.960 and MFI = 0.25.

5.

The procedure of Example 1 was followed except for the catalyst which consisted of 4.9 mmoles of $TiCl_4$ and of 2.46 mmoles of NN'diethylethylenediamidodialane corresponding to 9.8 mmoles of H*.

Hydrogen was fed at a pressure of 3 atmospheres and ethylene was fed up to a total pressure of 5 atmospheres, which pressure was kept constant by an ethylene flow. After two hours the polymerization reaction was stopped by butyl alcohol, then the polymer was centrifuged, washed with water and acetone and dried. 400 g of polyethylene were obtained having d = 0.964 and MFI = 1.5.

POLYMERIZATION EXAMPLES: PROPYLENE

1.

300 ml of anhydrous and airless n-heptane were loaded into a 750 ml autoclave; after it had been thermostated at 40°C the preformed catalyst was loaded, it consisting of 0.9 g of $TiCl_3AA$ and 0.17 g of NN'diethylethylenediamidodialane into 100 cc of n-heptane.

Propylene (Phillips) was fed at a pressure of 4 atmospheres and the pressure was kept at such a value by a propylene flow regulated by the same polymerization reaction. After two hours the reaction was stopped by an ethyl alcohol-acetone mixture, the polymer was filtered, washed by the alcohol-acetone mixture and dried at 50°C under vacuum. 50 g of polypropylene were obtained.

2.

The procedure of Example 1 was followed except for the catalyst which consisted of 0.9 g of $TiCl_3AA$ and 0.28 g of NN'diethylpropanediamidodialane into 100 ml of n-heptane. 17 g of polypropylene were obtained.

3.

The procedure of Example 1 was followed except for the catalyst which consisted of 0.9 g of $TiCl_3AA$, 0.27 g of NN'diethylethylenediamidodialane and 0.26 g of triethylamine. 8g of polypropylene were obtained.

4.

The procedure of Example 1 was followed except for the catalyst which consisted of 0.9 g of $TiCl_3AA$, 0.27 g of NN'diethylethylenediamidodialane and 0.2 cc of anisole corresponding to an anisole/aluminum molar ratio of 0.5. 17 g of polypropylene were obtained.

5.

The procedure of Example 3 was followed except for the catalyst which was used in an amount of 0.54 g. 15 g of polypropylene were obtained.

POLYMERIZATION EXAMPLES: ISOPRENE

1.

90 ml of anhydrous and airless hexane were loaded into a series of flasks having a 200 ml capacity; then $1.82.10^{-3}$ moles of $TiCl_4$ were fed with NN'diethylenediamidodialane in such an amount so as to have the following Al/Ti ratios: 0.7, 0.8, 0.9, 1.0. The flasks were plugged; the catalyst was allowed to age for 10 minutes, then 30 ml of freshly distilled isoprene were added. The flasks were plugged by a crown plug and put in a thermostat kept at 30°C. All the operations were carried out in a very anhydrous vessel. After 2 hours the polymerization was stopped by adding ethyl alcohol and the polymer was coagulated by ethyl alcohol too. After drying the following conversions were obtained:

| Al/Ti | Conversion % g dried polymer |
|---|---|
| 0.7 | 33.3 |
| 0.8 | 70.0 |
| 0.9 | 35.0 |
| 1.0 | 23.0 |

The obtained polyisoprenes had an 1.4 cis amount higher than 95%.

2.

The procedure of Example 1 was followed by using a catalyst consisting of $1.82.10^{-3}$ moles of $TiCl_4$ and N-N'diethylpropanediamidodialane in such amount as to have the following Al/Ti ratios: 0.8 and 0.9. Conversions of 45% were obtained. The obtained polyisoprenes had an 1.4 cis amount higher than 95%.

POLYMERIZATION EXAMPLES: COPOLYMERS

1.

2 Liters of anhydrous and airless n-heptane were loaded into a 4 liter autoclave provided with a turbine stirrer; it was thermostated at 90°C and then the preformed catalyst was loaded, it consisted of 0.8 g of $TiCl_3AA$ (corresponding to 2 mmoles/lt) and 0.34 g of NN'diethylethylenediamidodialane (corresponding to 4 mmoles/liter of H*).

Hydrogen was fed at a pressure of 3 atmospheres, it acting as molecular weight regulator, then ethylene and 4% by volume of propylene were sent up to a total pressure of 6 atmospheres, and the pressure was kept at such a value by an ethylenepropylene flow regulated by the same running of the polymerization reaction.

After 2 hours the reaction was stopped by butyl alcohol and after 3 hours of digestion the polymer was centrifuged, washed with a water-acetone mixture and dried. 250 g of copolymer were obtained having d = 0.950 and MFI = 0.5.

What we claim is:

1. A catalyst system useful for the homo- and co-polymerization of olefins, conjugated and unconjugated dienes or mixtures of said unsaturated compounds consisting essentially of a transition metal compound selected from the group consisting of $TiCl_3$ and $TiCl_4$ and an aluminum compound having the general formula:

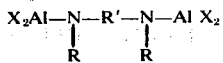

in which X is hydrogen or halogen; both R's are hydrocarbon radicals; and R' is an unsaturated or saturated aliphatic divalent hydrocarbon radical, unsubstituted cycloalkylene radical, or unsubstituted arylene raidcal.

2. A catalyst system as claimed in claim 1, wherein the group R' in the general formula of the aluminum compound represents —$(CH_2)_n$— wherein n is a whole number in the range between 2 and 6.

3. A catalyst system as claimed in claim 1, wherein the aluminum compound is NN'-diethylethylenediamidodialane.

4. A catalyst system as claimed in claim 1, wherein the aluminum compound is NN'-diethylpropylenediamidodialane.

5. A catalyst system as claimed in claim 1, wherein the aluminum compound is NN'-diethylhexamethylenediamidodialane.

6. A catalyst system as claimed in claim 1 wherein the aluminum compound is NN'-diisopropylethylenediamidodialane.

* * * * *

UNITED STATES PATENT AND TRADEMARK OFFICE
CERTIFICATE OF CORRECTION

PATENT NO. : 3,905,913
DATED : September 16, 1975
INVENTOR(S) : Marghertia Corbellini and Agostino Balducci It is certified that error appears in the above-identified patent and that said Letters Patent are hereby corrected as shown below:

Column 2, line 60, before "(b)" change "the point" to read --class--.

Column 3, line 35, "1:10" should read --1.10--.

Column 3, line 41, change the line to read

--found value: $\frac{H^*}{Al} = 1.86 \quad \frac{N}{Al} = 1.14$ --.

Column 4, line 28, change the line to read

--found value: $\frac{H^*}{Al} = 1.91 \quad \frac{N}{Al} = 1.06$ --.

Column 5, line 44, after "washed" change "by" to --with--.

Column 6, line 63, change "and" to --or--.

Signed and Sealed this eleventh Day of May 1976

[SEAL]

Attest:

RUTH C. MASON
Attesting Officer

C. MARSHALL DANN
Commissioner of Patents and Trademarks